Patented Dec. 7, 1948

2,455,396

UNITED STATES PATENT OFFICE 2,455,396

ORGANIC NITROGEN COMPOUNDS AND METHODS FOR OBTAINING SAME

Robert Raymond Adams and Harry Stone Mosher, State College, Pa., assignors to Parke, Davis & Company, Detroit, Mich., a corporation of Michigan No Drawing. Application July 19, 1943, Serial No. 495,354

11 Claims. (Cl. 260—251)

The invention relates to pyrimidines substituted at position 4 of the pyrimidine nucleus by one or more amino-substituted alkyl amine groups.

We have discovered a distinctly new and useful class of 4-aminoalkylamino-pyrimidines and 4-substituted-aminoalkylamino-pyrimidines. The new compounds are valuable as intermediates for new heterocyclic organic compounds and many of them are directly of value for therapeutic purposes, especially as internal antiseptics.

The compounds of our invention have the general formula,

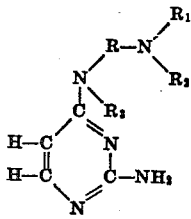

where R is a straight or branched chain alkylene residue, $-C_nH_{2n}-$, where $n$ is an integer less than 7, $R_1$ and $R_2$ are the same or different members of the class hydrogen, lower alkyl, lower hydroxy alkyl and, when taken together, the residue of a nitrogen-containing organic heterocyclic ring such as morpholine, piperidine, piperazine, thiomorpholine, tetrahydroquinoline and the like, and where $R_3$ is a member of the class hydrogen, lower alkyl, hydroxy lower alkyl and the above defined group

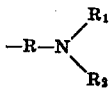

The compounds of the invention can, in general, be prepared by reacting a 2-amino-4-halogeno-pyrimidine with the appropriate aminoalkyl-, or substituted aminoalkyl-, primary or secondary amine. The desired aminoalkyl group is thereby introduced into the 2-amino-4-halogeno pyrimidine at the 4-position of the latter. The reaction of the primary or secondary basically substituted amine with the halo-pyrimidine can be carried out using as a solvent an excess of the polybasic amine over that needed for reaction with halopyrimidine. One can also use an inert tertiary amine base as a solvent for the reaction, such as triethylamine, pyridine, N-ethyl piperidine and the like. The tertiary amine and/or excess of primary or secondary polybasic amine, serves to neutralize the hydrogen halide formed in the reaction. The 2-amino-4-halogeno pyrimidines employed are those in which the halogen in the 4 position of pyrimidine is one of the halogens, chlorine or bromine.

Considerable variations in reaction times, temperatures, molecular proportions of reactants, solvents, etc., are possible when preparing the compounds of the invention.

For example, the following variations in the general method can be used.

1. One mole of 2-amino-4-chloropyrimidine will react with slightly more than one mole of the basically substituted primary or secondary amine in pyridine as a solvent. However, it will be found that the yields of product are greatly improved as the proportion of reacting primary or secondary amine is increased to about two moles for each mole of halopyrimidine. The usual temperature of reaction is about 150° C. for four hours, but it may be as low as 130°–140° C. with heating from about 3 to 8 hours.

2. One mole of 2-amino-4-chloropyrimidine can be heated with 1.1 to 1.5 moles of appropriate primary or secondary amine in the presence of one mole of triethyl amine or N-ethyl piperidine or like tertiary amine. In this case, the reaction mixture should be kept at about 130–150° C.

3. One mole of 2-amino-4-chloropyrimidine is reacted at 130–150° C. for 3 to 6 hours with 2 moles (an excess) of the basically substituted primary or secondary amine. The excess amine serves as solvent.

4. A mole of 2-amino-4-chloropyrimidine is reacted with 2.75 to 3 moles of an amine containing a secondary, and also a primary, aliphatic amine grouping, while using pyridine as a solvent.

5. One mole of 2-amino-4-chloropyrimidine is heated with considerable excess (e. g. 5 to 8 moles) of an aliphatic amine containing two primary amine groups. For example, the following transformations can be carried out with the proportions of reactants mentioned;

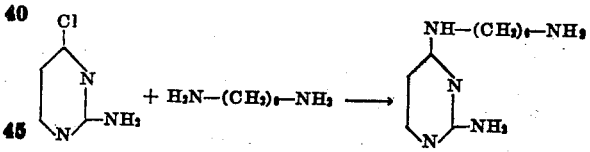

In this variation, the reaction may be carried out in a Carius tube, pressure vessel, or an open flask heated in an oil bath or on the steam bath. The reaction mixture may need to be cooled, since in some cases the reaction proceeds very rapidly. The reaction mixture is usually heated at 140–155° C. for one to five hours to complete the reaction. However, this is not always necessary since a temperature of 100° C. for two hours is sufficient in some instances.

Under the conditions given in variations 1, 2 and 3 above, the polybasic secondary amines require a longer reaction time and a higher temperature than the corresponding primary amines in order to obtain the best results. However, the usual conditions of 150° C. for four hours are almost always sufficient to bring about the desired reaction.

Under variation 1, better yields result if two moles of the amine are used with one mole of chloropyrimidine.

The pyridine may be omitted in variation 4, if desired.

By use of suitable diluents or solvents, all of the varations can be carried out in an open vessel while heating the reaction mixture under reflux.

The following specific examples serve to illustrate the invention more fully.

EXAMPLE 1

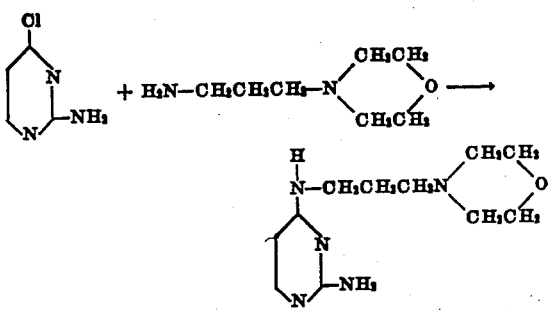

A mixture consisting of 10.9 g. (1 mole) of 2-amino-4-chloropyrimidine, 20 g. (1.66 moles) of γ-morpholino-propylamine and 25 cc. of pyridine is placed in a Carius tube or appropriate reaction vessel and heated for four hours at 150° C. The reaction mixture is placed over approximately 20 g. of flake sodium hydroxide and allowed to stand overnight. The sodium chloride-sodium hydroxide is removed by filtration and discarded. The pyridine is removed by distillation at atmospheric pressure and the residue rectified under reduced pressure. The product is obtained as a light yellow oil boiling at 195–210° C. under 3 mm. of pressure. The yield is 15.2 g. or 76% of the theoretical amount. The product crystallizes as an oily solid on long standing. The trihydrochloride salt, prepared by dissolving the product in n-amyl alcohol and adding a standardized solution of n-amyl alcohol saturated with dry hydrogen chloride, melts at 208–9° C. after recrystallization from n-butanol-ethyl acetate-ether mixture. The picrate salt melts at 218–19° C. after recrystallization from acetone-ethanol mixture.

EXAMPLE 2

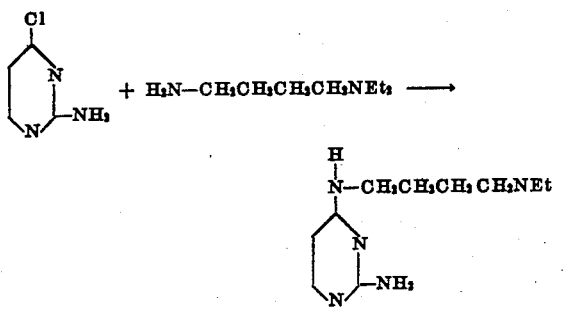

A mixture consisting of 7.5 g. (.0581 moles) of 2-amino-4-chloropyrimidine and 19 g. (.132 moles) of Δ-diethyl-aminobutylamine is placed in a Carius tube or appropriate reaction vessel and heated for five hours at 150° C. The reaction mixture is placed over approximately 20 g. of flake sodium hydroxide and allowed to stand overnight. The sodium chloride-sodium hydroxide is removed by filtration and discarded. The product is distilled under reduced pressure and is a light yellow oil boiling at 195° C. under 3 mm. pressure. The yield is 10.8 g. or 79% of the theoretical amount. The picrate salt melts at 174–175° C. after recrystallization from acetone-ethanol mixture.

EXAMPLE 3

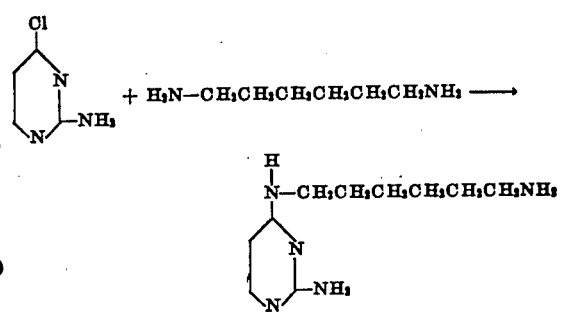

A paste consisting of 40 g. (1 mole) of 2-amino-4-chloropyrimidine and 126 g. (3.5 moles) of hexamethylene diamine is placed in a flask and heated in an oil bath for five hours at 155° C. The mixture is placed over approximately 65 g. of flake sodium hydroxide and allowed to stand overnight. The sodium chloride-sodium hydroxide is removed by filtration and discarded. The product is obtained on distillation as a light yellow oil boiling at 218–21° C. under 3 mm. pressure. The product crystallizes and after recrystallization from petroleum ether has a melting point of 91–2° C. The yield is 43 g. or 66.3% of the theoretical amount. The picrate salt after recrystallization from acetone-ethanol mixture melts at 208–9° C.

EXAMPLE 4

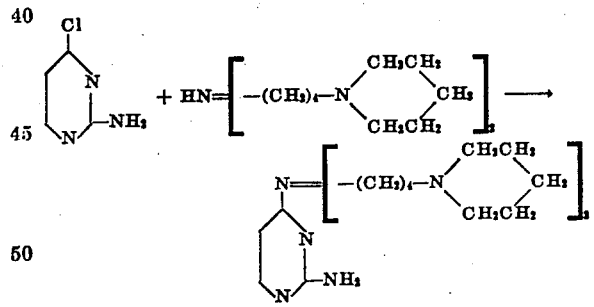

A mixture consisting of 6.5 g. (1 mole) of 2-amino-4-chloropyrimidine, 18.6 g. (1.25 moles) of di-(Δ-piperidino-butyl)-amine and 25 cc. of pyridine is placed in a Carius tube or appropriate reaction vessel and heated at 150° C. for eight hours. The reaction mixture is placed over approximately 20 g. of flake sodium hydroxide-sodium and allowed to stand overnight. The sodium chloride-sodium hydroxide is removed by filtration and discarded. The pyridine is distilled off at atmospheric pressure and the product obtained by distillation under reduced pressure. The product is a light yellow oil boiling at 255–60° C. under 3 mm. pressure and crystallizes to a tan oily solid. The yield is 9.0 g. or 46% of the theoretical amount. The picrate salt after recrystallization from acetone-ethanol mixture melts at 190–2° C.

The tan, solid free base may be converted to its hydrochloride by dissolving the base in n-amyl alcohol and adding an excess of n-amyl alcohol saturated with dry hydrogen chloride. The hydrochloride separates and is filtered off and washed with a small amount of dry ether and the white crystalline solid thereby obtained recrystallized from n-butanol-ethyl acetate-ether mixture, filtered off, washed with ether and dried.

Either the free base of this example or its acid addition salts, such as the hydrochloride, can be used as antimalarials.

EXAMPLE 5

15 grams of ω-diethylaminopentylamine, (see Magidson & Grigorovskii Ber. 69, 396) are mixed with 6 g. of 2-amino-4-chloropyrimidine and heated in a sealed tube at 160° C. for five hours. After cooling, the bomb is opened and the product stirred over solid sodium hydroxide. After filtering the sodium chloride and excess solid sodium hydroxide, the product is distilled under reduced pressure and the viscous clear liquid resulting is converted to the tri-hydrochloride salt of 2-amino-4-(ω-diethylaminopentylamino) pyrimidine by treating with butyl alcohol saturated with dry hydrogen chloride. The transformation of this example can be represented by the following,

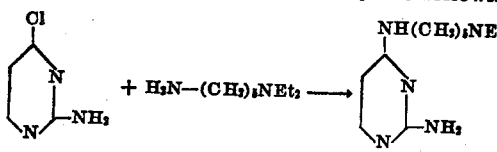

EXAMPLE 6

The main transformation of this example may be represented as follows,

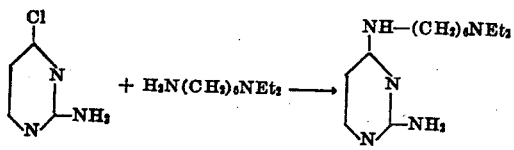

17 grams of ω-diethylaminohexylamine (see Magidson and Grigorovskii Ber. 693, 396), 20 grams of pyridine and 6 grams of 2-amino-4-chloropyrimidine are mixed intimately and heated in a sealed tube at 160° for eight hours. The semi-solid reaction mixture is worked up by stirring on a steam bath for 30 minutes over solid sodium hydroxide, filtering the excess sodium hydroxide and sodium chloride, and distilling the filtrate under diminished pressure. A very viscous light yellow high boiling liquid free base is obtained. This is converted to the tri-hydrochloride of 2-amino-4-(ω-diethylaminohexylamino) pyrimidine by bubbling hydrogen chloride through an ethereal solution of the free base.

The following examples show how to obtain various additional amine products of the invention, the hydrochlorides of each being crystallizable from a mixture of anhydrous n-butyl alcohol, ethyl acetate and ether. The hydrohalides can also be crystallized from straight ethyl alcohol or other alcohols alone. The amines used in these examples may be obtained by catalytic hydrogenation, (using Raney nickel catalyst at about 100° C.), of the appropriate compound of general formula, N=C—(CH₂)ₙ—(C₂H₅)₂.

EXAMPLE 7

Di-(ω-diethylaminobutyl)amine (20 g.) is mixed with 13 g. of 2-amino-4-chloropyrimidine, 15 cc. of pyridine added, and the mixture heated in a bomb tube at 160-170° C. for about 5 hours. After the reaction is complete, the tube is opened and the pyridine solution poured onto solid sodium hydroxide, stirred, filtered, and the pyridine removed by distillation. The desired product, 2-amino-4- di -(ω - diethylaminobutyl)-amine, is distilled under reduced pressure and the viscous oil converted to the tetrahydrochloride

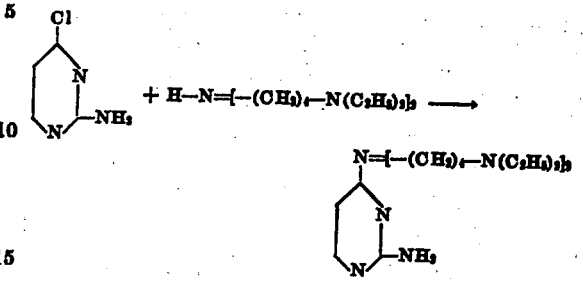

EXAMPLE 8

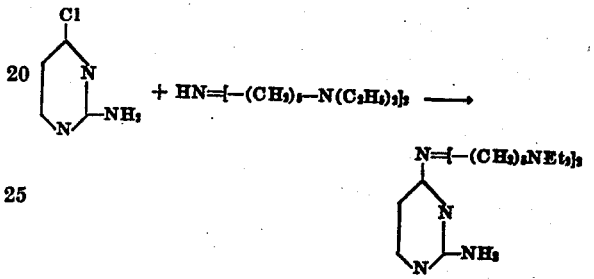

Di-(ω-diethylaminoamyl) amine (20 g.) is mixed with 12 g. of 2-amino-4-chloropyrimidine and 15 cc. pyridine. The mixture is heated to 160-170° C. in a bomb tube, then worked up in the usual manner, after the reaction is complete. The product, 2 - amino-4 - di - (ω - diethylaminoamyl) amine, is distilled under reduced pressure and the heavy oil converted to the tetrahydrochloride which is obtained as a white crystalline solid.

EXAMPLE 9

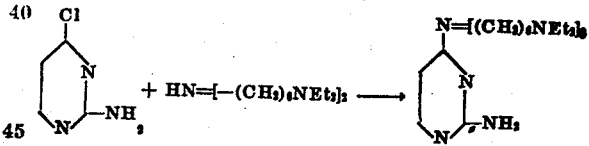

Di-(ω-diethylaminohexyl) amine (20 g.) is mixed with 12 g. of 2-amino-4-chloropyrimidine and 15 cc. of pyridine and reacted in the usual manner at 160° C. for 5 hours. The reaction mixture is washed up as before and the product, 2-amino-4 - [di - (ω - diethylaminohexyl) amino]-pyrimidine, distilled under reduced pressure. The thick viscous oil is crystallized as the tetrahydrochloride, a white crystalline solid.

EXAMPLE 10

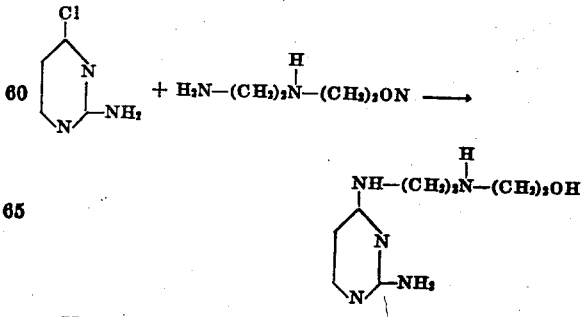

Hydroxyethyl ethylenediamine, 45 g., is mixed with 12 g. of 2-amino-4-chloropyrimidine and the mixture heated in oil, bath at 170° C. for 8 hours, cooled, and stirred over solid sodium hydroxide. The excess hydroxyethylethylene diamine is removed by heating at about 150° C. under a high vacuum. The residue is worked up by dissolving in chloroform, boneblacking, precipitating the base with ligroin and converting to the hydrochloride by use of a hydrogen chloride solution in butanol to give a white powder; 2-amino-4-($\beta$-hydroxyethylamino) ethylamino pyrimidine.

Numerous other examples of reaction of a 2-amino-4-halo-pyrimidine with a suitable primary or secondary aminoalkyl amine or substituted aminoalkyl amine to obtain the new 2-amino-4-aminoalkyl amino substituted pyrimidines can be carried out in accordance with the disclosure and illustrations given above under the examples. By way of further illustration, the following tables indicate how to obtain some of these other compounds coming within the scope of our invention:

Table I

| Compound No. | Radical X used in formula of free base, below, (pyrimidine-NH₂) | B. P./3 mm. | M. P. of hydrochloride | M. P. of picrate |
|---|---|---|---|---|
| 1 | XNH—(CH₂)₂N(C₂H₅)₂ | 183–5 | 128–30° C | 176°. |
| 2 | XNH(CH₂)₃N(n-Propyl)₂ | 150–80 | | 138–40°C. |
| 3 | XNH(CH₂)₃N(n-Amyl)₂ | 203–5 | | 148–9° C. |
| 4 | XNH(CH₂)₃–N(piperidine ring) | 178–80 | 170–2° C | 185°. |
| 5 | XNH(CH₂)₃NH₂ | 196–200 | | 204.5–205. |
| 6 | XN(C₂H₅)(CH₂)₃N(C₂H₅)₂ | 173–8 | | 161°. |
| 7 | XNH(CH₂)₄–N(piperidine ring) | 204–7 | | 174–6°. |
| 8 | XNH(CH₂)₄–N(morpholine ring) | 150–210 | 165–8° | 211–211.5. |
| 9 | XNHCH—CH₃ (CH₂)₃ N(C₂H₅)₂ | 184–7 | | 177° C. |
| 10 | XN=[(CH₂)₂N(C₂H₅)₂]₂ | 183–7 | 206–7° C | 139–42°. |
| 11 | XN=[—(CH₂)₃—N(piperidine)]₂ | 243–8 | 176–8° | 186–88. |
| 12 | XNH(CH₂)₃NH₂ | 196–203 | | 190–2° C. |
| 13 | XN=[—CH—CH₃ (CH₂)₃ N(C₂H₅)₂]₂ | 170–203 | | |
| 14 | XN=[(CH₂)₄—N(morpholine)]₂ | 254° C. | soft at 98–100° C. dec. at 115° C. | 242°. |

The proportions of reactants and other data relating to the process by which the products of Table I were obtained are given in Table II below.

Table II

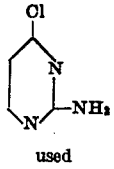

| Compound No. | Grams (and moles) of [chloropyrimidine-NH₂] used | Grams (and moles) of prim. or sec. amine used | cc. of pyridine whenever used | grams of product | yield in percent |
|---|---|---|---|---|---|
| 1 | 10 grams (1 mole) | 14.9 g. (1.5 moles) | 25 | 11.1 | 64.3 |
| 2 | 7.5 g. (.0581) | 10 g. (.0641) | 25 | 6.8 | 51.5 |
| 3 | 7.3 g. (.0565) | 20 g. (.0933) | 25 | 11.7 | 67.4 |
| 4 | 10 g. (1) | 16.3 g. (1.5) | 25 | 11.9 | 65.5 |
| 5 | 44.8 g. (.34) | 103 g. (1.35) | 0 | 43.5 | 75 |
| 6 | 9.4 g. (.073) | 19.2 (.122) | 25 | 9.2 | 50.2 |
| 7 | 10 g. (1.34) | 16.2 g. (1.34) | 25 | 10.3 | 53.4 |
| 8 | 7.5 g. (1) | 12.0 g. (1.32) | 25 | 6.8 | 28.6 |
| 9 | 10 g. (.0775) | 20.4 g. (.129) | 25 | 11.5 | 54.0 |
| 10 | 6.8 g. (1) | 17.0 g. (1.34) | 25 | 9.7 | 54.7 |
| 11 | 6.5 g. (1) | 17.7 g. (1.25) | 25 | 6.6 | 36.3 |
| 12 | 13.2 g. (.102) | 30 g. (.306) | 25 | 11 | 55.1 |
| 13 | 7.5 g. (.058) | 34.8 g. (.116) | 25 | 12.0 | 52.6 |
| 14 | 3.28 g. (0.0254) | 10.0 (.0333) | 25 | 3.8 | 31.9 |

Most of the free base compounds of Tables I and II are solids.

As will be apparent from the above description, the invention not only includes the new amines of the general formula given, but also the addition salts of these amines with non-toxic organic and inorganic acids, such as hydrochloric, phosphoric, sulfuric, hydrobromic, boric, sulfamic (NH₂–SO₃H), citric, lactic, tartaric, acetic, butyric, ascorbic, succinic, salicylic and nitric acids.

The preferred compounds of the invention are those in which $n$ of the substituted or unsubstituted alkylene residue R is an integer less than 7 and more than 2, because such compounds are generally more effective chemotherapeutic agents, especially as antimalarials, than the corresponding compounds where $n$ is 1 or 2.

What we claim as our invention is:

1. Compounds of the formula

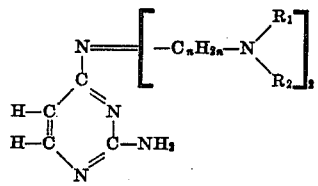

where $n$ is an integer less than 7, and where $R_1$ and $R_2$ are members of the class H, lower alkyl, lower hydroxy alkyl and together a residue constituting, with the nitrogen atom to which they are attached, the radical of an organic saturated 6 membered heterocyclic ring compound having said nitrogen atom in the ring.

2. Compounds of the formula

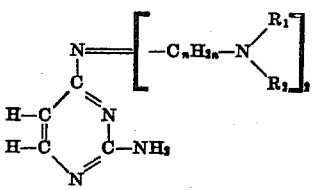

where $n$ is an integer less than 7 and more than 2 and where $R_1$ and $R_2$ are members of the class H, lower alkyl, lower hydroxy alkyl and together a residue constituting, with the nitrogen atom to which they are attached, the radical of an organic saturated 6 membered heterocyclic ring compound having said nitrogen atom in the ring, and addition salts of said compounds with non-toxic acids.

3. Compounds of the formula,

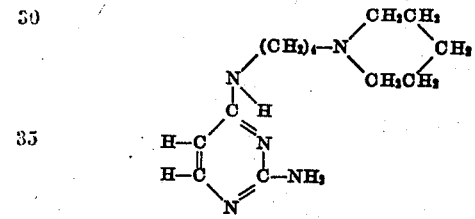

and addition salts of said compounds with non-toxic acids.

4. Compounds of the formula,

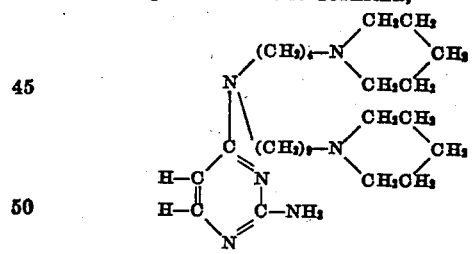

and addition salts of said compounds with non-toxic acids.

5. Hydrochloride of the compound of the formula,

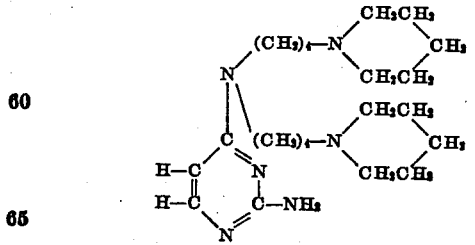

6. Compounds of the formula

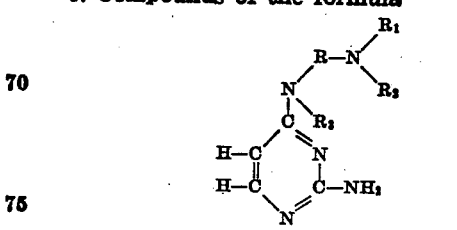

where R is an alkylene residue of the class —$C_nH_{2n}$—, $n$ being an integer below 7, $R_1$ and $R_2$ being members of the class H, lower alkyl, lower hydroxy alkyl, and together a residue constituting, with the nitrogen atom to which $R_1$ and $R_2$ are attached, the radical of an organic saturated 6 membered heterocyclic ring compound having said nitrogen atom in the ring, and where $R_3$ is a member of the class H, lower alkyl, hydroxy lower alkyl and the above defined group

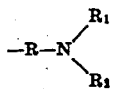

and addition salts of said compounds with non-toxic acids.

7. Compounds of the formula

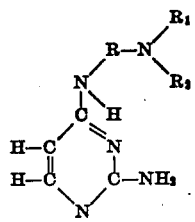

where R is an alkylene residue of the class —$C_nH_{2n}$—, $n$ being an integer below 7, $R_1$ and $R_2$ being members of the class H, lower alkyl, lower hydroxy alkyl, and together a residue constituting, with the nitrogen atom to which $R_1$ and $R_2$ are attached, the radical of an organic saturated 6 membered heterocyclic ring compound having said nitrogen atom in the ring, and addition salts of said compounds with non-toxic acids.

8. The compound of the formula

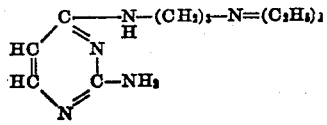

9. Compounds of the formula

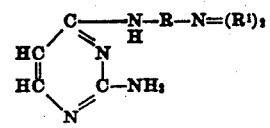

where R represents an alkylene group and $R^1$ represents an alkyl group.

10. A process for preparing a compound of the formula,

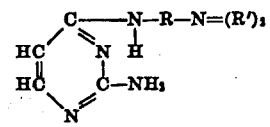

which comprises heating a halopyrimidine of the formula,

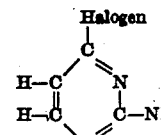

with a primary amine of the formula,

where R represents an alkylene group and R' represents an alkyl group.

11. The process for preparing 2-amino-4-(α-diethylaminopropylamino) pyrimidine which comprises heating 2-amino-4-chloropyrimidine with α-diethylaminopropylamine.

ROBERT RAYMOND ADAMS.
HARRY STONE MOSHER.

No references cited.